United States Patent [19]
Sheldon et al.

[11] 3,771,760
[45] Nov. 13, 1973

[54] VALVES

[75] Inventors: William Joseph Sheldon, Bolton; Bernard Gaylard, Leigh, both of England

[73] Assignee: Burnden Park Engineering Company Limited, Bolton, England

[22] Filed: Oct. 28, 1971

[21] Appl. No.: 193,329

[30] Foreign Application Priority Data
Oct. 29, 1970 Great Britain.................. 51,564/70

[52] U.S. Cl. ................................................. 251/75
[51] Int. Cl. ........................................... F16k 31/56
[58] Field of Search ..................................... 251/75

[56] References Cited
UNITED STATES PATENTS
2,070,661  2/1937  Hughes ............................. 251/75 X
1,571,401  2/1926  Erickson ............................. 251/75
1,722,412  7/1929  Eisenhauer ......................... 251/75

Primary Examiner—Henry T. Klinksiek
Attorney—Kurt Shaffert et al.

[57]  ABSTRACT

Disclosed is a valve having operating means and a valve member and means associated therewith to vary, at least at some part of the movement of the valve member, the effort required to be applied to, or by, the operating means to achieve a predetermined amount of movement of the valve member. The latter means is arranged to go over-center as the valve member moves away from the valve seat.

14 Claims, 13 Drawing Figures

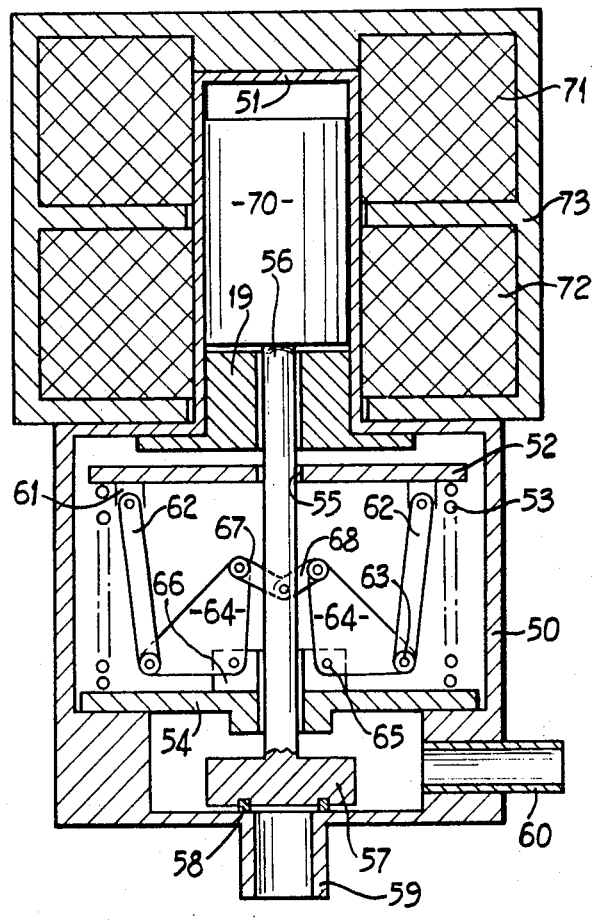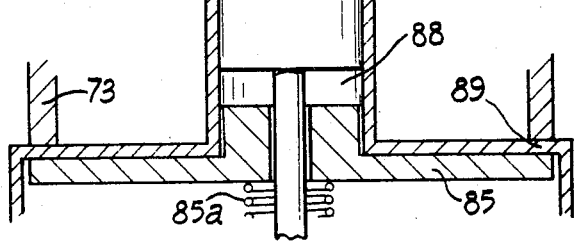

VALVES

This invention relates to valves for controlling fluid flow.

In the nuclear energy industry valves are used extensively in the handling of uranium hexafluoride ($UF_6$) in gaseous and in liquid form. Elaborate precautions are required to ensure that no escape or leakage occurs. Hitherto valves suitable for handling uranium hexafluoride have suffered from sealing problems due to the need to transmit mechanical operation through the valve casing. Also with solenoid operated valves problems arise in connection with the increasing coil size required to produce increasing forces.

According to the invention a valve comprises a valve member cooperable with a valve seat, operating means for moving the valve member away from the valve seat, means biassing the valve member in one sense, and means associated with the operating means and the valve member arranged to vary, at least at some part of the movement of the valve member, the effort required to be applied to, or by, the operating means to achieve a predetermined amount of movement of the valve member.

The invention may be performed in various ways and some specific embodiments, with possible modifications, will now be described by way of example with reference to the accompanying drawings, in which:

FIG. 7 is a section through one embodiment;

FIG. 10 is a section through part of another modified arrangement;

Figure 1:
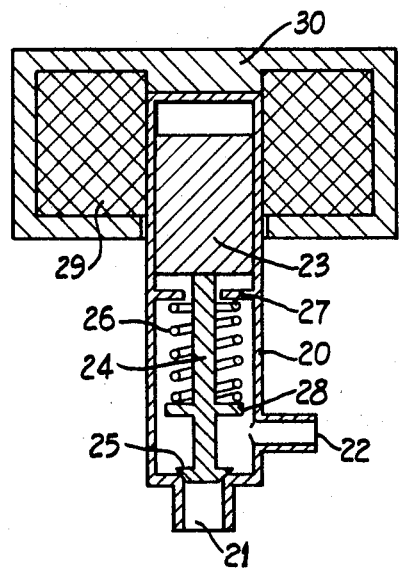
FIG. 1 is a section through a known single-acting valve with the valve member biased by a spring to the closed position.

Referring to FIG. 1, there is shown a known single-acting solenoid operated valve comprising a non-magnetic casing 20 formed with an inlet 21 and an outlet 22 for fluid flow. A valve member is in the form of a slug 23 of magnetisable material such as iron fixed to a non-magnetisable rod 24 having a valve head 25 which can sealingly engage on a valve seat around the inlet 21. A helical spring 26 engages between an inner flange 27 on the casing 20 and a flange 28 on the rod 24 to bias the valve member towards the closed position shown. An electric coil 29 surrounds the upper part of the casing and is arranged to be supplied with electric current from a source (not shown). An iron casing 30 surrounds the coil to provide a magnetic circuit. On energization of the coil, magnetic forces are generated which act on the slug 23 to move the valve member upwardly in the drawing, against the spring, and to open the valve. As long as the coil is suitably energised the valve remains open.

The spring 26 must be sufficiently strong to maintain a fluid tight seal when the valve is closed. For example the spring may exert a maximum sealing force of 400 lbs. The coil structure must therefore be sufficiently large to provide a magnetic field strong enough to hold the valve open against this large spring force.

Figure 2:
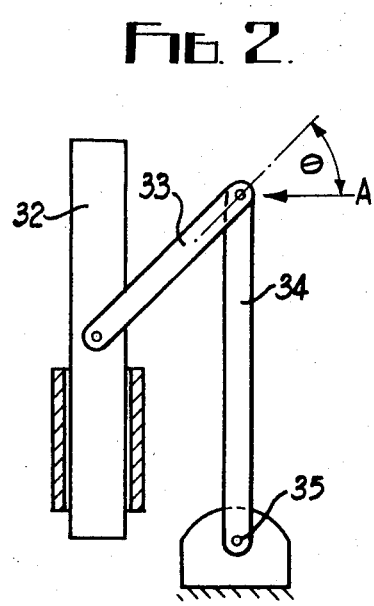
FIG. 2 is a view of a linkage.
Figure 3:
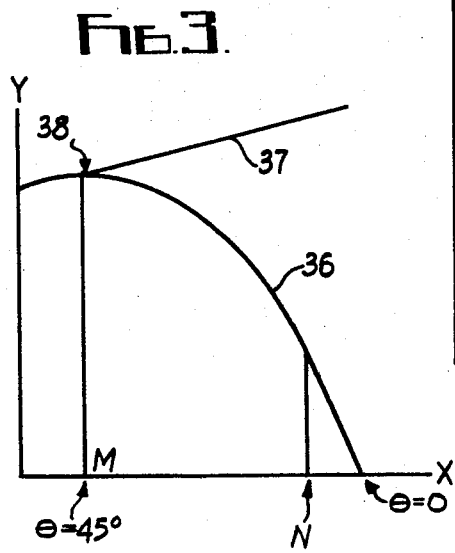
FIG. 3 is a force-position diagram.

In some embodiments of the present invention, in order to reduce the weight and bulk and power requirements of the solenoid arrangement which would otherwise be required, the applied spring force may be tailored to particular requirements, that is varied in a desired manner, for example the spring may be arranged to apply sufficient sealing force when the valve is closed but a lesser force when the valve is open. This enables the hold current, and thus the coil size, required in the coil structure to be reduced to keep the valve open. In general, a mechanism changes the longitudinal biassing force applied to the valve member at least at some part of the range of movement of the valve member so that the effort required to be applied to, or by, the operating means to achieve a predetermined movement of the valve member is also varied. One suitable mechanism for varying the spring thrust is shown diagrammatically in FIG. 2. The reciprocating stem 32, such as rod 24, has pivoted to it one end of a link 33 which is pivoted to one end of another link 34 pivoted at 35 to a fixed part of the valve. The spring is arranged to act in the direction of arrow A. The spring and linkage mechanism are inside the valve casing 20. If $\theta$ is the angle between the spring thrust and the longitudinal axis of link 33, the longitudinal force (Y axis) applied to the reciprocating part 32 is approximately proportional to $\sin 2\theta$ and is a maximum when $\theta = 45°$ and approaches zero as $\theta$ approaches zero. FIG. 3 shows a typical curve 36 of force applied to stem 32 against distance (X-axis) of the valve member from the closed position. Curve 37 is that for a spring acting directly on the valve stem without a linkage, and as in FIG. 1. M is the valve closed position and N the valve open position.

The flat part 38 of the curve at $\theta = 45°$ is important since it can be utilised to lessen the need for close control of the valve member position when shut. This makes the mechanism less sensitive to wear, adjustment and manufacturing tolerances.

Figure 4:
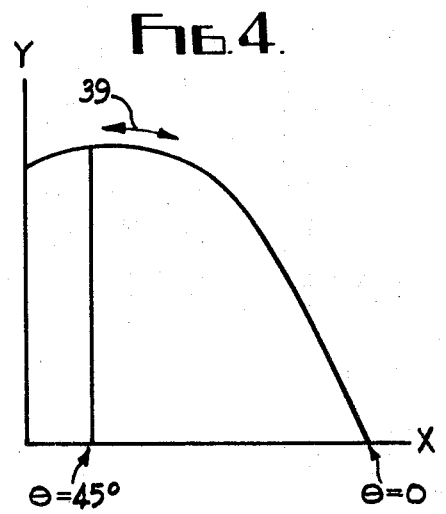
FIG. 4 is another force-position diagram.

The flatenning effect can be enhanced by arranging for the spring rate to counterbalance the decreasing mechanical advantage of the linkage as the valve member moves away from the closed position, the spring compressing during this movement, over the critical portion 39 of the stroke in which the valve member is at or adjacent to the closed position, giving the type of force diagram of FIG. 4. In this arrangement, the spring rate is chosen such as to counterbalance the tendency of the linkage to change the applied spring force over the critical part 39 of the stroke so as to maintain a substantially constant applied force over this critical range of movement 39. This technique can for example be used where the valve is closed for angles other than $\theta = 45°$.

Figure 5:
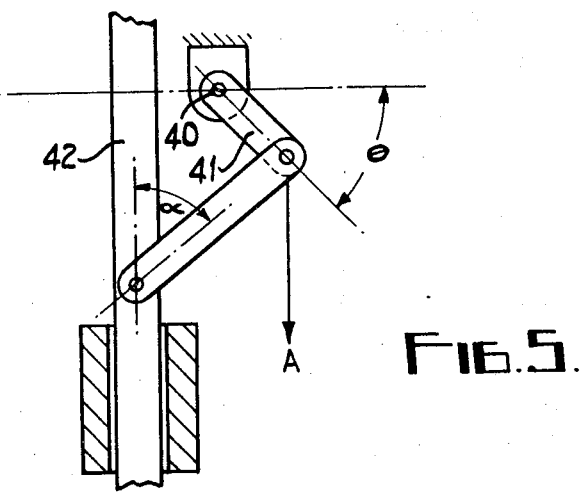
FIG. 5 is a view of another linkage.
Figure 6:
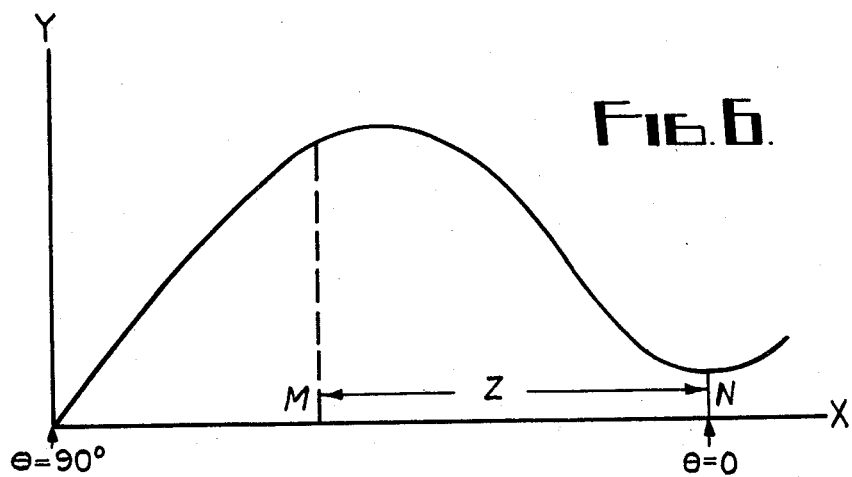
FIG. 6 is a further force-position diagram.

By using a reverse swing linkage, as in FIG. 5, it is possible to flatten both ends of the curve. Referring to FIG. 5, the fixed pivot 40 for link 41 may be on or on either side of the centre line of the reciprocating component 42. FIG. 6 shows the general shape of the force curve when the arrangement is as in FIG. 5, in which when $\theta$ is zero, $\alpha$ is less than 90°. Preferably when $\theta$ is zero, $\alpha$ lies between 75° and 85°. A typical operating range is shown in FIG. 6 at Z.

In these linkage arrangements, two or more equally spaced sets of linkages may be used to reduce or eliminate side thrust on the reciprocating part by suitably spacing the linkages around the reciprocating part.

Referring now to FIG. 7, which shows a valve according to the invention having such a linkage mechanism, the valve comprises a casing of 99.5 percent pure aluminium consisting of a lower part or body 50 and an upper part or cap 51.

A brass floating platform 52 is engaged by a helical compression spring 53 acting between the platform 52 and a fixed guide plate 54 secured against a shoulder in the body 50. The platform 52 is provided with a central aperture 55 through which a valve member or spindle 56 can move. Platform 52 is centralized in the housing. This can be achieved by arranging for the rod 56 to slidably engage in aperture 55. However other means can be used, such as the use of more than two sets of linkages or by use of inclined links such as links 62. Aperture 55 can thus be considerably larger than the diameter of spindle 56. The valve member 56 carries or has integral therewith a flange or head 57 at its lower end. The head 57 carries sealing means, such as a PTFE ring 58, which can sealingly engage the lower wall of the body 50 around a fluid inlet 59. A fluid outlet 60 is provided in the side wall of the body 50.

A lug 61 extends downwardly from the plate 52 and one end of a link 62 is pivotally connected to the lug, the other end of the link 62 being pivotally connected at 63 to one arm of a bell crank lever 64 pivotally mounted at 65 to an upstanding lug 66 on the fixed plate 54.

The other arm of the lever 64 is pivotally connected at 67 to one end of a further link 68 which is pivotally connected to the valve stem 56. A similar linkage is disposed diametrically opposite. The various pivotal axes are parallel and at right angles to the spindle axis. In the position shown, the spring 53 urges the linkages into a position in which the valve head seals around the inlet 59 and prevents fluid flow through the valve.

The valve member 56 is constructed from brass or stainless steel and carries a magnetisable or magnetic slug 70 at its upper end. The slug may for example be of nickel plated mild steel.

The cap 51 is surrounded by an electromagnetic coil structure arranged on energisation from a suitable source to generate magnetic forces to cause the valve member 56 to rise to open the valve. In the arrangement shown the coil structure comprises two annular coils 71, 72 in an iron casing 73 providing a magnetic circuit. A fixed iron collar 19 completes the magnetic circuit.

In operation, when it is desired to open the valve, the coil structure is energised as described below and the magnetic forces acting on the iron slug 70 cause the valve member 56 to rise clear of its seating against the action of the spring 53.

As mentioned, on suitable energization and de-energization of the coil structure, the valve opens and closes. During the opening movement, the linkages are such that the spring force opposing the opening movement progressively decreases as the valve is progressively opened. However, in addition, the linkage is arranged to go over centre towards the end of the opening movement and thus the hold current, i.e. the current required to hold the valve open, is reduced to zero, the spring holding the valve open. Some means of unlocking the linkage is thus required in order to close the valve and this is achieved by the double acting solenoid shown.

FIG. 7 shows the valve in the closed position. A pulse of current through coil 71 will move the valve stem upwards away from the closed position against the progressively decreasing spring force and will carry the linkage over-centre, moving the valve stem to a locked, open position. As the linkage goes over-centre, the axial component of force applied by the spring to the valve member changes from urging the valve member downwards in the drawing to urging the valve member upwardly. Coil 71 can then be de-energised and the valve remains open. A pulse of current through coil 72 will move the stem downwards against the spring force to carry the linkage over-centre in the opposite direction and the spring will move the valve to the fully closed position. Coil 72 can then be de-energized and the valve remains closed. With the use of the over-center mechanism, the valve moves to the closed or open position with a snap action.

Figure 8:
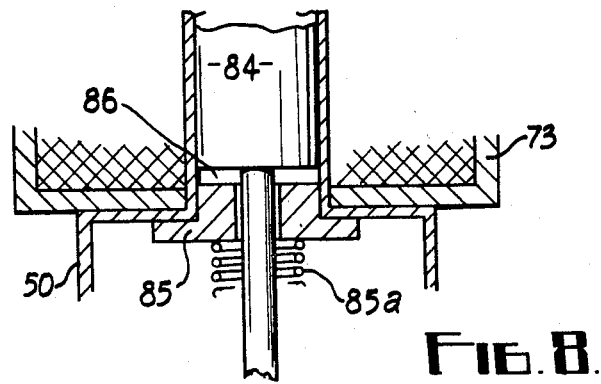
FIG. 8 is a section through part of a modified arrangement.
Figure 9:
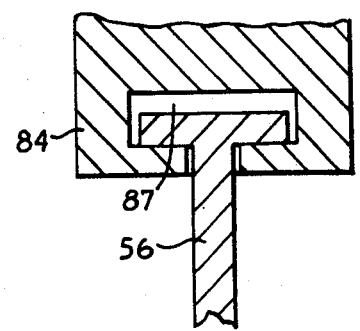
FIG. 9 is a section through part of a further modified arrangement.

The required magnitude of the pulses can be decreased enabling a further reduction in coil size, by employing limited-free-movement arrangements at one or both of the positions shown in FIGS. 8 and 9. In FIG. 8 a collar 85, which normally completes the magnetic circuit, is movable on the valve stem and is biased upwardly by a separate light spring 85a which serves to urge the collar 85 upwardly. The light spring may engage a fixed flange or a flange connected to the valve stem. On the downward stroke of the slug under the effect of a pulse through coil 72 the air gap 86 between the slug and the collar closes after the linkage goes over-centre but before the slug movement is completed, further downward movement of the slug to the valve closed position being effected by the main spring 53.

In FIG. 9 the valve stem 56 has an annular head (T-shaped in cross section) located in a T-shaped recess in the slug. The relationship between the air gap 87 and the slug travel under the effect of a pulse is that in one or both directions of slug and valve stem movement, the valve stem moves independently of the slug after the movement of the slug (and with it the valve stem) has pushed the linkage over-centre.

These arrangements reduce the air gaps to the minimum required to obtain the movement to throw the locking mechanism over-centre. This in turn decreases the ampere-turns required and hence the coil size necessary.

In order to reduce the impact between valve and seat, the arrangement of FIG. 10 may be used. When coil 71 is energised, the magnetic force moves the slug to close the gap at 88 the light spring normally keeps gap 89 closed. The gap at 88 is arranged such that the movement required to close the gap 88 takes the linkage over-centre but not far enough to allow the valve head to touch the valve seat. When the slug engages the collar 85, thus closing the gap 88, the gap 89 is still closed. The valve continues to close, opening gap 89, against an upwardly directed magnetic force applied to the collar 85 through the casing 73 to resist downward movement of the valve under the action of kinetic energy and thus reduce the speed of the valve stem. The casing 73 can be enlarged or have a flange at its lower end to increase the area of overlap with collar 85 and reduce magnetic leakages. In some arrangements the upward magnetic force may be sufficient to stop the valve closing movement until the current is turned off whereafter the spring closes the valve.

The valves described above have linkages between the spring and the valve member, but it will be understood that the connection between the spring and the valve member may comprise as an alternative or in addition a cam and cam follower arrangement in order to achieve the varying spring force over at least a part of the range of valve member movement.

The cam arrangement is preferred as it provides the opportunity of closer tailoring of the applied spring force to specific requirements.

Figure 11A:
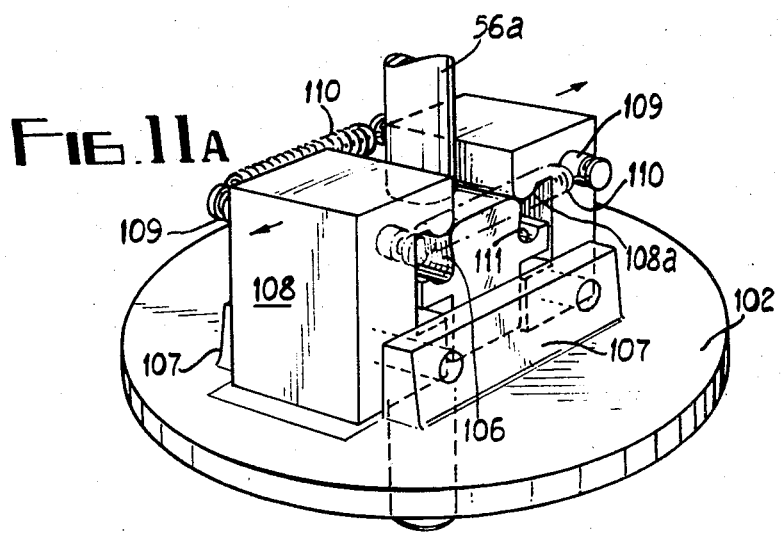
FIG. 11a is a perspective view of part of FIG. 11 on an enlarged scale.
Figure 11:
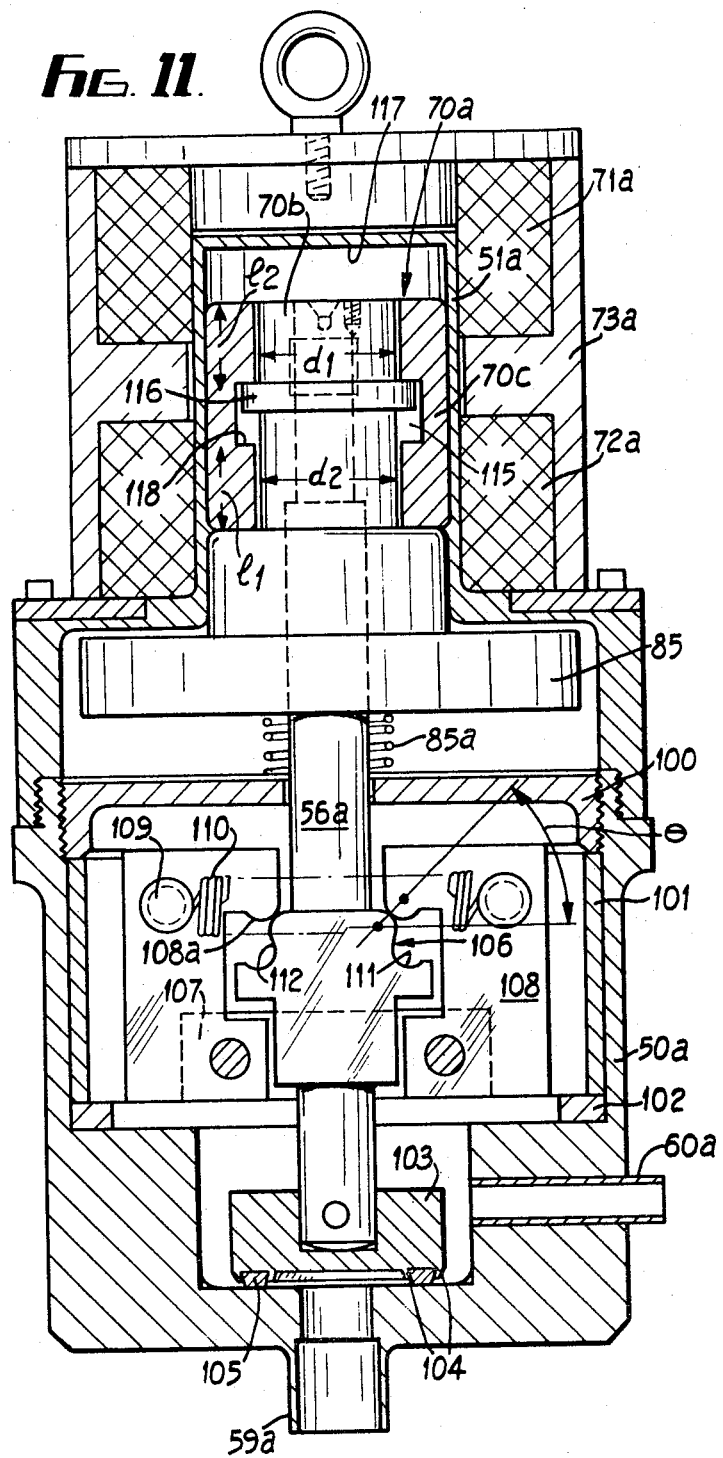
FIG. 11 is a section through another embodiment.

One such embodiment is illustrated in FIG. 11, in which parts similar to FIG. 7 have been given the same reference numerals but with the suffix a. The casing 51a is screw threaded to the casing 50a which has screwed internally a bearing block 100 which urges an annular distance piece 101 into engagement with a disc 102. A light helical spring 85a extends between the block 100 and an axially movable magnetizable collar 85. The valve member 56a has a slug 70a screwed at its upper end and its lower end is pivotted to a valve head 103 formed with annular flanges 104 which are peened over to engage a tapered sealing ring 105 of PTFE.

The valve member 56a has a portion of enlarged cross-section shaped to provide two diametrically opposite elongated cam surfaces 106 at right angles to the valve axis.

The disc 102 has two upstanding ribs 107 between which are pivotted two cam followers 108. Two lugs 109 extend laterally from each follower 108 and two helical compression springs 110 extend between the lugs on opposite sides of the valve member.

In the closed position shown, the curved cam follower portions 108a are over-centre in one sense, i.e. angle $\theta$ is more than 0°, and urge the valve member towards the closed position. The sealing force of the valve member may be say between 300 lbs. and 500 lbs. On energization of coil 71a, as described above, the valve member moves away from the inlet, the cam/cam follower goes over-centre and the curved portions 108a move along the cam surfaces 106 until in the fully open position they rest in a curved portion 111 of the cam surfaces which act as a stop. The cam surfaces 106 may, as shown, have a slight inward taper 112 so that the spring force urges the valve open. On energization of coil 72a the valve will close, as described above.

Instead of being fixed, the cam follower portions 108a could be formed on rollers to reduce friction.

Figure 12:
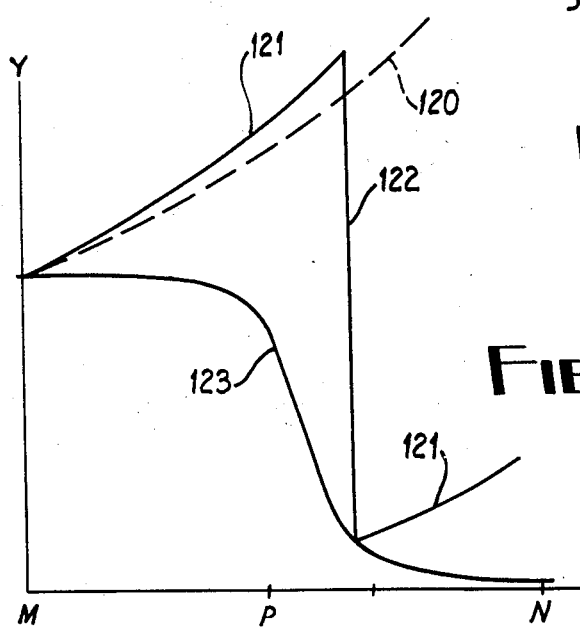
FIG. 12 is another force-position diagram.

FIGS. 11 and 12 illustrate a further modification which can be used in the various solenoid arrangements. The slug 70a is formed in two annular parts 70b, 70c, the outer part 70c having say three-fourths of the total cross-sectional area of the slug. A lost motion connection of slot 115 and lug 116 is provided between the two slug parts. When coil 71a is energized, an upward force is exerted on both slug parts and both tend to move upwards but outer part 70c moves more quickly thus reducing the air gap between that part of the slug and the end face 117 of the casing 51a and thus reducing the current required. The shoulder 118 engages lug 116 before part 70c engages face 117 and the slug parts then move together to the valve open position. This reduces the bulk and size of coil required. FIG. 12 provides an illustration of the force Y exerted by the solenoid against the valve member position X. M is the valve closed position, or the valve open and P indicates the position of cam or linkage dead centre. Curve 120 is with an unsplit slug and curve 121 is for a split slug showing a drop at 122 when the lost motion has been taken up. Curve 123 is an "ideal" curve in which the pull (Y axis) exerted by the solenoid closely follows the opposition provided by the spring. The slug could be split into several annular parts to provide a particular relationship between the current required and the position of the valve member.

The distances $l_1$, $l_2$, $d_1$, $d_2$ can be varied independently to vary the current/valve member position relationship on the opening and closing movements.

It can be seen that the valves constitute completely sealed units with no mechanical operating parts projecting from the casing. Thus, though fluid can seep through the aperture 55 it cannot seep or leak from the casing and for this reason the valve is suitable for handling liquid uranium hexafluoride which is extremely searching and requires to be completely sealed in because of its dangerous nature. Moreover, the materials from which the valve is constructed will stand up to uranium hexafluoride at the temperatures of about 80°C and above which are involved in handling the fluid during preparation of nuclear reactor fuel. The valve is suitable for handling liquid or gaseous $UF_6$ and other gases and liquids. In an alternative there may be metal-to-metal contact between the valve member and its seating to provide the necessary seal and this at the same time requires little or no maintenance even when used in conjunction with liquid $UF_6$. However, the use of sealing material such as PTFE is preferred. Valves constructed in accordance with the above embodiments may be leak proof to a maximum leak rate of one clusec per litre or less.

Various modifications may be made. When used for fluids other than uranium hexafluoride, the valve parts may be constructed of different materials compatible with such fluids. Other materials may in any event be used in construction of the various parts provided they are compatible with the fluid involved. For example, in some cases the valve member could be entirely constructed of iron or other magnetisable material. The valve may be readily adapted for remote control by the provision of suitable control circuits and switching gear.

It will be appreciated that the FIGS. 7 and 11 arrangements need not have a double acting solenoid but could have a single annular coil as in FIG. 1 but in this case no locking action is obtained for the valve unless an over-centre mechanism is used. Furthermore the valve may be such as to be held open by a spring and held closed by a current in the coil or coils.

It must be understood that a linkage and a cam mechanism could be provided.

It will also be appreciated that the spring force as transmitted to the linkage need not be at right angles to the valve stem (as shown at A in FIG. 2), but should have a longitudinal component on the valve stem in the open and closed positions. Thus in FIGS. 2, 5 the spring force could be inclined to the direction shown.

It will be noted in connection with FIG. 6 that the applied sealing force is not a maximum at the valve closed position but somewhat less than a maximum. Ideally it would be a maximum, but some sealing thrust may be sacrificed to obtain a larger or smaller stroke or movement for the valve stem to accommodate a desired size or proportions of the valve parts.

In the above described valves the linkage or cam connection operates between the spring and the valve member. It will be understood that it is possible for the linkage or cam mechanism to operate between the slug and the movable valve member. It is also possible to provide a linkage or cam connection between the spring and the valve member and a separate linkage or cam connection between the slug and the valve member.

Also in FIG. 11 the cam follower can be connected directly to the spring, e.g. a leaf spring.

In the above arrangements the valve is totally sealed from the atmosphere and has no operating parts passing through the valve casing. However the invention is not limited to such valves. For example the invention can be used in any valve in which a movable valve member is biassed towards or away from a closed or open position, or, as described above, is biassed towards both the closed and open positions using at connection which can go over-centre. Also the valve need not be operated electro-magnetically but could be operated manually or mechanically or be fluid operated.

What we claim is:

1. A valve for controlling fluid flow comprising a fluid-tight housing having a fluid inlet and a fluid outlet, said housing having disposed therein a valve member cooperable with a valve seat in the housing to control flow between the inlet and the outlet, spring means arranged to apply a force to said valve member, a mechanism associated with said spring means and said valve member, said mechanism being arranged to go over-center as said valve member moves away from said valve seat and so that said spring means urges the valve member towards said seat in the valve closed position and away from said seat in the valve open position, and electromagnetic operating means for moving the valve member towards and away from said valve seat, said mechanism being arranged to reduce the force applied to the valve member by the spring means for at least part of the movement of the valve member from the valve closed or valve open position to the position at which the mechanism goes over-center.

2. A valve in accordance with claim 1, wherein said electromagnetic operating means is exterior of said housing.

3. A valve in accordance with claim 2, wherein said mechanism includes cam means.

4. A valve in accordance with claim 3, wherein said cam means comprises two cams movable with said valve member and two cam followers respectively engaging said cams, said spring means urging said cams and followers into engagement.

5. A valve in accordance with claim 3, wherein said cam means comprises a cam movable with said valve member and a cam follower carried by said housing.

6. A valve in accordance with claim 2, wherein said electromagnetic operating means has a magnetic circuit which includes a collar movable relative to said valve member, light spring means biasing said collar away from said valve seat, said collar being engageable by said valve member to cushion the closing movement of said valve member.

7. A valve in accordance with claim 2, wherein said mechanism is arranged so that the force required to move the valve member is greater when said valve member engages said valve seat.

8. A valve in accordance with claim 2, wherein said electromagnetic operating means comprises two coils arranged so that energization of one coil will carry said mechanism over-center in one sense and energization of the other coil will carry said mechanism over-center in the opposite sense.

9. A valve in accordance with claim 2, wherein said electromagnetic operating means comprises a magnetizable member having at least two relatively movable parts arranged so that on energization of said electromagnetic operating means one of said parts initially moves further than the other of said parts to reduce the current required to move said valve member a predetermined amount.

10. A valve in accordance with claim 9, wherein one of said parts is annular and the other of said parts is movable in a bore of said one part, said other part having a flange movable in a recess in the inner surface of said one part and of greater axial extent than said flange.

11. A valve in accordance with claim 2, further comprising a sealed housing without any operating parts extending through any wall thereof.

12. A valve in accordance with claim 2, wherein said mechanism comprises a linkage having a mechanical advantage that changes during at least part of the movement of said valve member.

13. A valve in accordance with claim 12, wherein the mechanical advantage is greatest when said valve member engages said valve seat.

14. A valve in accordance with claim 2, wherein said spring means applies the force to said valve member through said mechanism.

* * * * *